Sept. 6, 1949. A. L. STONE 2,481,255
INDEX DEVICE FOR ROTATING BODIES
Filed Aug. 16, 1946 2 Sheets-Sheet 1

Albert L. Stone. INVENTOR.

BY
J. D. McKean
ATTORNEY.

Sept. 6, 1949.  A. L. STONE  2,481,255
INDEX DEVICE FOR ROTATING BODIES
Filed Aug. 16, 1946  2 Sheets-Sheet 2

Albert L. Stone. INVENTOR.

BY

J. G. McKew
ATTORNEY.

Patented Sept. 6, 1949

2,481,255

UNITED STATES PATENT OFFICE 2,481,255

INDEX DEVICE FOR ROTATING BODIES

Albert L. Stone, Palos Verdes Estates, Calif., assignor, by mesne assignments, to Standard Oil Development Company, Elizabeth, N. J., a corporation of Delaware Application August 16, 1946, Serial No. 690,945

3 Claims. (Cl. 74—424.8)

The present invention is directed to an indexing means whereby a member may be rotated through a cycle of fixed length.

In commercial operations it is sometimes desirable to provide an indexing means for a rotating member whereby the member is passed through a predetermined cycle which may be repeated indefinitely.

For example, a member may be employed in the connecting and disconnecting of screw threads and it is sometimes desirable to provide means whereby the member may be rotated a predetermined amount in a forward direction and stop in a fixed position, and then reversed and stopped at a fixed position marking the termination of the reverse cycle and the beginning of the forward cycle.

It is an object of the present invention to provide an indexing means for a rotatable member adapted to be moved through a reversible cycle wherein the rotatable member is stopped at a fixed point after it has been rotated a predetermined amount in one direction and upon reversal rotates until it is stopped at a fixed point which serves as the starting point for the next cycle.

The device of the present invention may be described briefly as involving a frame having a passage defining a screw thread and a cylindrical member carried by the frame with the cylindrical member having an outer surface defining a thread cooperating with that defined by the frame; the frame member and the rotatable member defining surfaces radial with respect to the axis of the cylindrical member adapted to cooperate to terminate the rotation of the rotatable member at a fixed point after rotation in one direction and to stop the rotatable member in another fixed point after rotation in the opposite direction whereby the rotatable member may be rotated through a reversible cycle with rotation terminated at fixed points at each end of the cycle.

It will be understood that the indexing means of the present invention may be utilized in a wide variety of services. For example, the rotatable member may be a split annulus adapted to be placed around a pipe for rotating it a fixed number of revolutions. As another alternative, the indexing means may be incorporated in apparatus whereby a first member supplies the means for rotating a second member through a fixed cycle and wherein the first member is an idler body which serves as an indexing means to terminate the rotation of the second member after it has moved a predetermined amount.

The present invention will now be described in greater detail in conjunction with the drawing.

Figure 1:
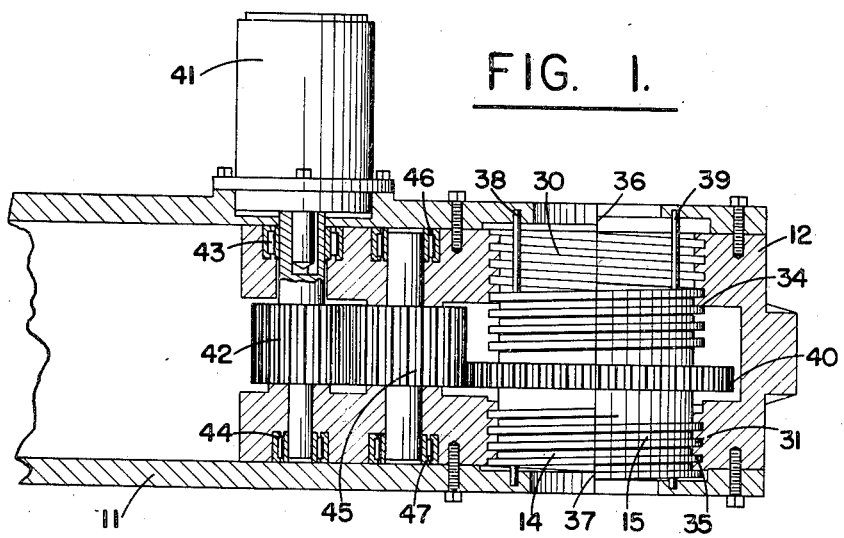
Fig. 1 is an elevation partly in section showing an embodiment of the present invention applied to an apparatus for spinning pipe.
Figure 2:
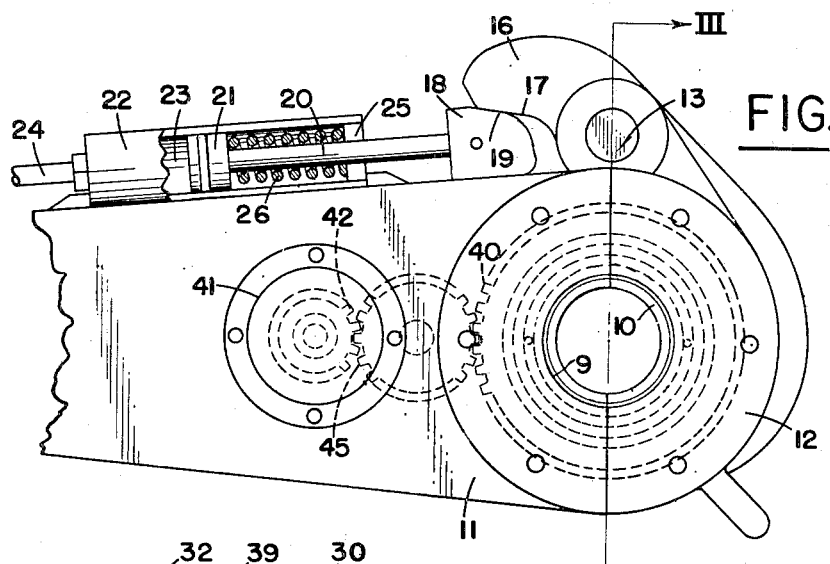
Fig. 2 is a top view of the apparatus of Fig. 1.
Figure 3:
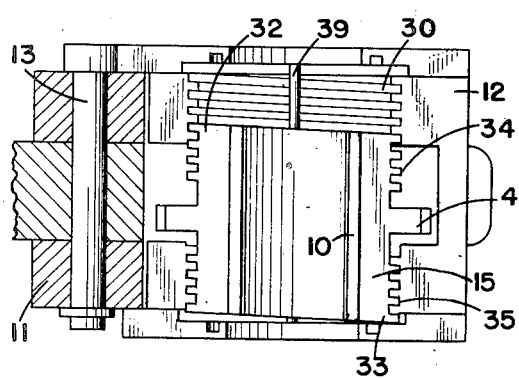
Fig. 3 is a view along line III—III of Fig. 2 showing in greater detail the arrangement of the indexing means.
Figure 4:
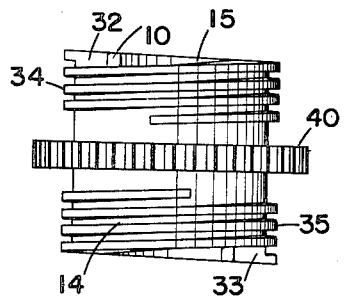
Fig. 4 is a view of a portion of the indexing means of the preceding figures.

Referring now specifically to the drawing and first to the embodiments of Figs. 1 to 4, a frame 11 has a jaw 12 pivoted thereto by pin 13. The frame and jaw serve as a mounting means for an embodiment of the present invention consisting of portions 14 and 15 which are halves of an annulus and together make up a tubular structure.

In order to provide a surface for engaging with pipe to be rotated by the device, a sheet 9 is mounted on the interior surface of member 14 and a sheet 10 is mounted on the interior surface of member 15.

Jaw member 12 defines a projection 16 having surface 17. The jaw member may be held in closed position by member 18 which defines a cam surface 19 arranged to cooperate with surface 17. Member 18 is mounted on rod 20, the other end of which has a piston 21 attached thereto. Piston 21 is slidably arranged in cylinder 22 mounted on frame 11, the piston and the cylinder defining a chamber 23 to which access is provided by conduit 24. Mounted on the cylinder is an annulus 25 and a spring 26 is mounted between the piston and the annulus. It will be seen that the spring biases the member 18 away from jaw 12 to allow the jaw to be readily opened, but that the jaw may be retained in position by exerting pressure through conduit 24 to move piston 21 toward annulus 25 thereby contacting surface 19 with surface 18.

Frame 11 and jaw 12 cooperate to define a passage with the walls of the passage defining an upper screw thread 30 and a lower screw thread 31. When members 14 and 15 have their edges placed together to form an annulus, the outside surfaces thereof define an upper screw thread 34 and a lower screw thread 35 which screw threads cooperate respectively with screw threads 30 and 31, previously described. The upper screw thread defines an upper shoulder 32 and the lower screw thread defines a lower shoulder 33. Frame 11 defines an upper stop 36 and a lower stop 37.

Rotation of the annulus structure made up of members 14 and 15 in one direction with respect to frame 11 brings shoulder 32 into contact with stop 36 thereby causing the rotation thereof to be terminated at a fixed point; rotation in the opposite direction of the structure made up of members 14 and 15 brings shoulder 33 into contact with stop 37 thereby terminating the rotation of the annulus structure at a fixed point.

In order to retain portions 14 and 15 in position when the jaw is open, these portions define longitudinally extending passages with a rod 38 extending through the passage defined by member 14 and a rod 39 extending through the passage defined by member 15; the upper ends of the rods fit into an annular groove defined by members 11 and 12 and the lower ends of the rod fit into an annular groove similarly defined by members 11 and 12. In order to transmit rotary motion to the annulus made up of members 14 and 15 the outside surfaces of these members define a gear 40 spaced between upper thread 34 and lower thread 35.

Means for rotating the annulus consisting of parts 14 and 15 is provided by a prime mover 41 mounted on frame 11 and arranged to drive gear 42 journalled to frame 11 through journals 43 and 44. An idler gear 45 is arranged to mesh with gear 42 and is mounted on frame 11 by journals 46 and 47. It will be seen that rotation of motor 41 in one direction transmits power to the annulus consisting of members 14 and 15 and causes it to rotate in a given direction (for example upwardly) until stopped by contact of one shoulder with a corresponding stop (for example shoulder 32 and stop 36); while reversing the direction of rotation of motor 41 causes the annular structure to rotate in the opposite direction (for example downwardly) until the other shoulder contacts with the other stop (for example shoulder 33 and stop 37).

Figure 5:
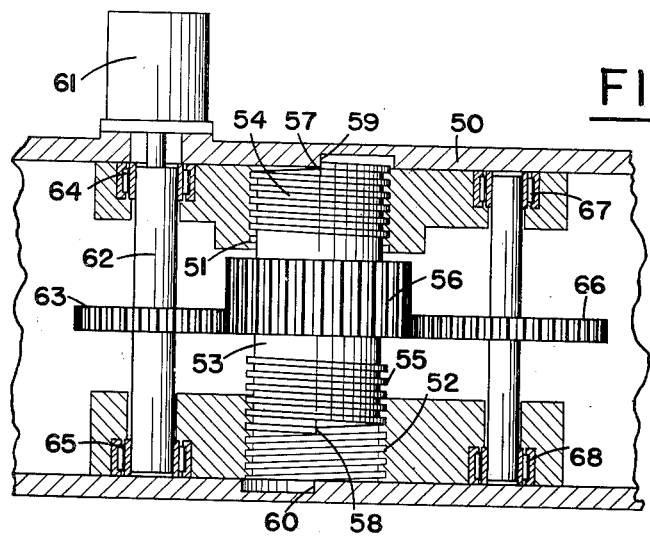
Fig. 5 is a view of another embodiment of the present invention.
Figure 6:
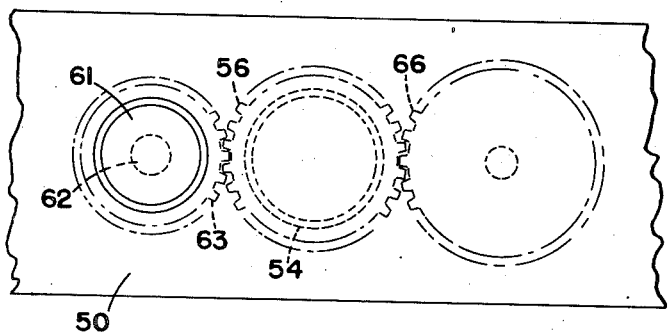
Fig. 6 is a view of a portion of the embodiment of Fig. 5.

Another embodiment of the present invention is shown in Figs. 5 and 6. In this embodiment a frame 50 defines a passage with the walls of the passage defining an upper thread 51 and a lower thread 52. Mounted in the passage is member 53 having its outer surface defining an upper thread 54, a lower thread 55, and gear 56 between the upper and lower threads. The upper thread terminates in an upper shoulder 57 and the lower thread terminates in a lower shoulder 58. Mounted on the frame 50 is an upper stop 59 arranged to engage with the upper shoulder 57 when member 53 is in its uppermost position and a lower stop 60 adapted to contact with lower shoulder 58 when member 53 is in its lowermost position.

Mounted on frame 50 is a prime mover 61 arranged to transmit power through drive shaft 62 to gear 63 mounted to frame 50 by journals 64 and 65. A gear 66 is arranged to mesh with the gear teeth 56 of member 53 and is mounted on the frame by journals 67 and 68.

It will be obvious that in the embodiment of Figs. 5 and 6 the element 53 serves as an idler gear. Energy is transmitted through gear 63 to element 53 and from it to gear 66 which serves as the power transmission gear. In the arrangement shown, gear 66 must be rotated through a fixed cycle. That is to say, rotation of prime mover 61 in a given direction drives member 53 until one of the shoulders thereof contacts with a corresponding stop (for example shoulder 57 and stop 59) and terminates the rotation of member 53. Reversal of the direction of rotation of prime mover 61 causes member 53 to be moved in the opposite direction until the other shoulder comes into contact with the other stop (for example shoulder 58 and stop 60) and terminates the direction of rotation in this direction. Inasmuch as energy is transmitted from member 53 to gear 66 it will be obvious that each cycle gear 53 is rotated through a predetermined number of revolutions in a given direction, stopped at a fixed point and its direction of rotation reversed and the gear rotated the same number of times in the opposite direction where it is again stopped.

In the embodiment of Figs. 5 and 6, gear 66 is not shown as transmitting power to any particular element. It will be evident that the device may be utilized in any situation where it is desired to rotate a body through a cycle and stop the body positively at the end of the cycle. Gear 66 may transmit power in one direction of rotation and then be reversed to return it to its initial point preparatory to the transmission of power in the same direction again or, alternatively, it may transmit power as it is rotated in each direction.

While specific embodiments of the present invention have been disclosed, it will be obvious to a workman skilled in the art that various changes in the shapes, sizes and proportions of the several parts may be made without departing from the scope of the invention.

Having fully described and illustrated embodiments of the present invention, what is desired to be claimed as new and useful and to be secured by Letters Patent is:

1. An indexing device comprising a shaft defining a screw thread on at least a portion of its outer surface, a frame member, means in said frame member defining a support for said shaft, said means including screw threads adapted to cooperate with the screw threads on the outer surface of said shaft and to permit rotation of said shaft with respect to said frame member, a first stop member mounted on said frame member adjacent one terminus of the screw threads carried by said means, a second stop member mounted on said frame member adjacent another terminus of the screw threads carried by said means, the screw threads on said shaft terminating in a first shoulder adapted to contact said first stop member and terminating in a second shoulder adapted to contact said second stop member.

2. An indexing device comprising a shaft defining at least portions of a screw thread on its outer surface, a frame member, means in said frame member defining a support for said shaft, said means including at least portions of a screw thread adapted to cooperate with the portions of the screw thread on said shaft and to permit rotation of said shaft with respect to said frame member, a first stop member on said frame member adjacent an end of one of said screw thread portions, a second stop member on said frame member adjacent an end of another of said screw thread portions, said shaft defining a first shoulder adapted to contact said first stop member when said shaft is rotated in a first direction and defining a second shoulder adapted to contact said second stop member when said shaft is rotated in the opposite direction from said first direction.

3. An indexing device comprising a shaft, a frame member, means in said frame member defining a support for said shaft, said means including at least portions of a screw thread, a first stop member on said frame member adjacent an end of one of said screw thread portions, a second stop member on said frame member adjacent an end of another screw thread portion, said stop members facing in opposite directions, said shaft defining at least portions of a screw thread on its outer surface adapted to cooperate with the portions of the screw thread carried by said means for rotation with respect to said means and adapted to assume a first posiiton and a second position with respect to said means, one of said thread portions defined by said shaft terminating in a shoulder substantially normal to the surface defining the thread and arranged to contact one of said stop members and another thread portion defined by said shaft terminating in a shoulder substantially normal to the surface defining said thread and arranged to contact the other stop member.

ALBERT L. STONE.

REFERENCES CITED

The following references are of record in the file of this patent:

UNITED STATES PATENTS

| Number | Name | Date |
|---|---|---|
| 1,934,039 | Conrad | Nov. 7, 1933 |
| 2,091,858 | Johnson | Aug. 31, 1937 |